L. Eames,
Turning Regular Forms,
Nº 17,500.
Patented June 9, 1857.

UNITED STATES PATENT OFFICE.

LOVITT EAMES, OF KALAMAZOO, MICHIGAN.

MACHINE FOR PREPARING HUB-BLOCKS FOR THE LATHE.

Specification of Letters Patent No. 17,500, dated June 9, 1857.

*To all whom it may concern:*

Be it known that I, LOVITT EAMES, of Kalamazoo, in the county of Kalamazoo and State of Michigan, have invented a new and useful Machine for Boring and Preparing Timber for the Turning of Hubs for Vehicles; and I do hereby declare that the following is a full, clear, and exact description of the same, reference being had to the accompanying drawings, making a part of this specification, in which—

Figure 1:
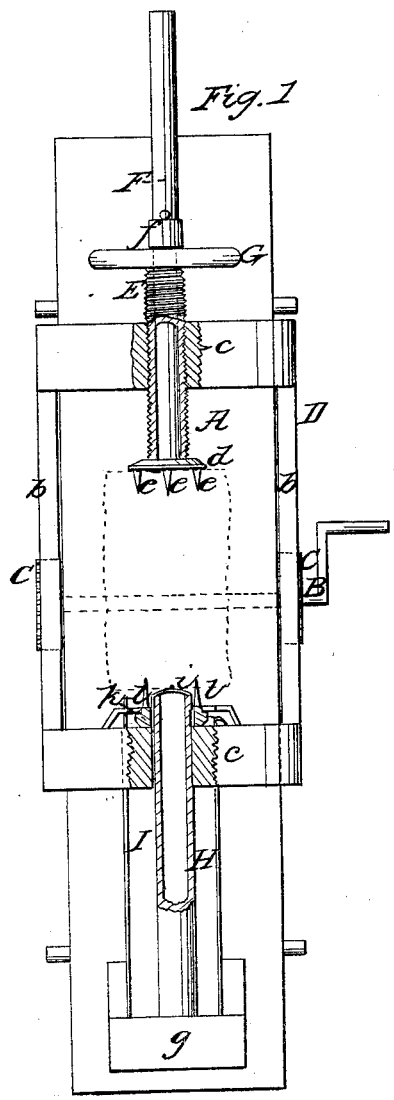
Figure 2:
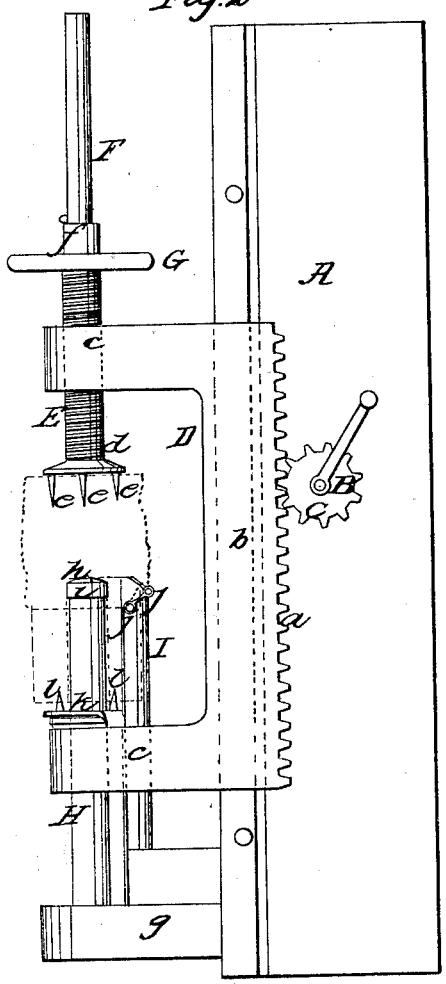

Figure 1 is a front view of my improvement; the chisel and arbor being partially bisected. Fig. 2 is a side view of the same.

Similar letters of reference indicate the same parts in both figures.

The object of this invention is to prepare blocks or pieces of timber for the turning of hubs by boring the mandrel holes and "roughing off" the blocks at one operation.

The object is attained by the employment or use of a hollow stationary auger and vertical plate with cutters attached; the above parts being used in connection with a rotating arbor and screw clamp attached to a sliding frame; the whole being arranged and operating as will be hereinafter fully shown and described.

To enable those skilled in the art to make and use my invention, I will proceed to describe its construction and operation.

A, represents a vertical beam or bar, through which a shaft B passes transversely, and on each end of this shaft a pinion C is placed. These pinions both gear into racks (a) at the back side of a frame D, which frame it fitted to the beam A and is allowed to slide freely up and down thereon.

The frame D may be constructed of cast metal, and is formed of two vertical sidepieces (b) (b) on the back edges of which the racks (a) are formed. The upper and lower ends of the sidepiece are connected by bowed crosspieces (c) (c).

Through the center of the upper crosspiece (c) a screw E passes. This screw is hollow and an arbor F passes through the screw; the lower end of the arbor having a disk (d) attached to it, the disk being provided with spurs (e). A collar (f) is placed on the arbor F, just above the screw E, and a hand wheel G is placed on the upper end of the screw.

Through the center of the lower crosspiece (c) of the frame D, a hollow auger H passes. The lower end of this auger is secured permanently to a projection (g) attached to the lower part of the beam or bar A. The cutters (h) are formed in a cap (i) which is secured on the upper end of the hollow shaft; and as the cutters become worn, they may be replaced by new ones; the cap being adjusted to and disconnected from the shaft.

I, represents a vertical plate, which is of curved form; the curve being a segment of a circle of which the auger is the center. On the upper end of the plate I, two cutters (j) (j) are secured. These cutters are attached to the plate so that they can be removed when worn or injured and replaced by new ones. The cutters (j) may be tubular or gage form; tubular cutters are shown in the drawings; one cutter being on the top of the plate and the other at the outer side of it, as shown clearly in Fig. 2.

At the center of the lower cross piece (c) and encompassing the auger H, a ring (k) is fitted; said ring having spurs (l) upon it.

The operation is as follows:—The blocks (m) shown in red are sawed in proper lengths, and the blocks are clamped or secured between the top of the auger H, and the disk (d) by screwing down the screw E. Motion is then given the arbor F, in any proper manner, and as the block (m) rotates the cutters (h) bore the mandrel hole; the chips pass down through the center of the auger; the block being fed to the auger by the gravity of the frame D, or extraneous power may be applied to shaft B, if desired. As the tube is being bored, the cutters (j) (j) "rough off" the block. The upper end of the plate I serves as a support and guide for the block rests upon it. When the block is bored through, its lower end will fall upon the spurs (l) and the ring (k) will rotate with the block until the arbor is stopped.

This invention has been practically tested; it operates well, and performs the work rapidly.

Having thus described my invention, what I claim as new and desire to secure by Letters Patent, is:

The vertical and stationary hollow auger H, guide and rest-plate I, with cutters (j) (j), attached, in combination with the rotating arbor F, and screw clamp E, attached to the sliding frame D, the whole being arranged substantially as shown, for the purpose set forth.

LOVITT EAMES.

Witnesses:
J. F. BUCKLEY,
SELIM F. COHEN.